(12) United States Patent
Nellikunje et al.

(10) Patent No.: US 11,965,763 B2
(45) Date of Patent: Apr. 23, 2024

(54) DETERMINING FLUID FLOW ACROSS ROTARY PUMP

(71) Applicant: MOZARC MEDICAL US LLC, Minneapolis, MN (US)

(72) Inventors: Krishnaraja Nellikunje, Bengaluru (IN); Hemanth Kumar Jain, Bengaluru (IN); Thisanth Gunasekaran, Bengaluru (IN)

(73) Assignee: Mozarc Medical US LLC, Minneapolis, MN (US)

( * ) Notice: Subject to any disclaimer, the term of this patent is extended or adjusted under 35 U.S.C. 154(b) by 166 days.

(21) Appl. No.: 17/525,720

(22) Filed: Nov. 12, 2021

(65) Prior Publication Data
US 2023/0152136 A1 May 18, 2023

(51) Int. Cl.
*G01F 1/88* (2006.01)
*G01F 1/06* (2006.01)
*G01F 1/50* (2006.01)

(52) U.S. Cl.
CPC .............. *G01F 1/88* (2013.01); *G01F 1/06* (2013.01); *G01F 1/50* (2013.01)

(58) Field of Classification Search
CPC ..... G01F 1/06; G01F 1/34; G01F 1/50; G01F 1/88; G01F 3/08; G01F 15/022
See application file for complete search history.

(56) References Cited

U.S. PATENT DOCUMENTS

| | | | |
|---|---|---|---|
| 474,732 A | 5/1892 | Gilmore | |
| 3,602,222 A | 8/1971 | Herndon | |
| 3,608,729 A | 9/1971 | Haselden | |
| 3,669,878 A | 6/1972 | Marantz | |
| 3,669,880 A | 6/1972 | Marantz | |
| 3,730,183 A | 5/1973 | Goldsmith | |
| 3,754,867 A | 8/1973 | Guenther | |
| 3,850,835 A | 11/1974 | Marantz | |
| 3,884,808 A | 5/1975 | Scott | |
| 3,989,622 A | 11/1976 | Marantz | |
| 3,989,625 A | 11/1976 | Mason | |
| 4,060,485 A | 11/1977 | Eaton | |
| 4,371,385 A | 2/1983 | Johnson | |
| 4,374,382 A | 2/1983 | Markowitz | |
| 4,381,999 A | 5/1983 | Boucher | |

(Continued)

FOREIGN PATENT DOCUMENTS

| | | |
|---|---|---|
| CN | 1273535 | 11/2000 |
| CN | 1643368 A | 7/2005 |

(Continued)

OTHER PUBLICATIONS

Dejardin, et al, Intraperitoneal pressure in PD patients: relationship to intraperitoneal volume body size and PD-related complications, Nephrol Dial Transplant. May 2007;22(5):1437-44.

(Continued)

*Primary Examiner* — Alexander A Mercado

(57) ABSTRACT

Systems, devices, and methods are provided for measuring fluid flow across a pump used in a system for precisely and accurately metering fluid. The systems, devices, and methods can use contactless approaches to measure the properties of the fluid being pumped. The measured properties can be used to precisely and accurately determine the flow rate through the pump.

20 Claims, 7 Drawing Sheets

(56) References Cited

U.S. PATENT DOCUMENTS

| | | |
|---|---|---|
| 4,460,555 A | 7/1984 | Thompson |
| 4,556,063 A | 12/1985 | Thompson |
| 4,562,751 A | 1/1986 | Nason |
| 4,581,141 A | 4/1986 | Ash |
| 4,650,587 A | 3/1987 | Polak |
| 4,661,246 A | 4/1987 | Ash |
| 4,678,408 A | 7/1987 | Mason |
| 4,685,903 A | 8/1987 | Cable |
| 4,747,822 A | 5/1988 | Peabody |
| 4,750,494 A | 6/1988 | King |
| 4,772,560 A | 9/1988 | Attar |
| 4,799,493 A | 1/1989 | DuFault |
| 4,826,663 A | 5/1989 | Alberti |
| 4,828,693 A | 5/1989 | Lindsay |
| 4,976,683 A | 12/1990 | Gauthier |
| 5,032,265 A | 7/1991 | Jha |
| 5,080,653 A | 1/1992 | Voss |
| 5,091,642 A | 2/1992 | Chow |
| 5,092,838 A | 3/1992 | Faict |
| 5,092,886 A | 3/1992 | Dobos-Hardy |
| 5,097,122 A | 3/1992 | Colman |
| 5,127,404 A | 7/1992 | Wyborny |
| 5,141,493 A | 8/1992 | Jacobsen |
| 5,284,470 A | 2/1994 | Beltz |
| 5,302,288 A | 4/1994 | Meidl |
| 5,305,745 A | 4/1994 | Zacouto |
| 5,318,750 A | 6/1994 | Lascombes |
| 5,468,388 A | 11/1995 | Goddard |
| 5,507,723 A | 4/1996 | Keshaviah |
| 5,643,201 A | 7/1997 | Peabody |
| 5,651,893 A | 7/1997 | Kenley |
| 5,683,432 A | 11/1997 | Goedeke |
| 5,744,031 A | 4/1998 | Bene |
| 5,762,782 A | 6/1998 | Kenley |
| 5,819,007 A | 10/1998 | Elghazzawi |
| 5,902,336 A | 5/1999 | Mishkin |
| 5,944,684 A | 8/1999 | Roberts |
| 5,987,352 A | 11/1999 | Klein |
| 6,042,721 A | 3/2000 | Peters |
| 6,048,732 A | 4/2000 | Anslyn |
| 6,052,622 A | 4/2000 | Holmstrom |
| 6,058,331 A | 5/2000 | King |
| 6,156,002 A | 12/2000 | Polaschegg |
| 6,230,059 B1 | 5/2001 | Duffin |
| 6,248,093 B1 | 6/2001 | Moberg |
| 6,254,567 B1 | 7/2001 | Treu |
| 6,321,101 B1 | 11/2001 | Holmstrom |
| 6,362,591 B1 | 3/2002 | Moberg |
| 6,363,279 B1 | 3/2002 | Ben-Haim |
| 6,505,075 B1 | 1/2003 | Weiner |
| 6,554,798 B1 | 4/2003 | Mann |
| 6,555,986 B2 | 4/2003 | Moberg |
| 6,589,229 B1 | 7/2003 | Connelly |
| 6,602,399 B1 | 8/2003 | Fromherz |
| 6,609,023 B1 | 8/2003 | Fischell |
| 6,627,164 B1 | 9/2003 | Wong |
| 6,645,191 B1 | 11/2003 | Knerr |
| 6,676,608 B1 | 1/2004 | Keren |
| 6,689,083 B1 | 2/2004 | Gelfand |
| 6,706,007 B2 | 3/2004 | Gelfand |
| 6,711,439 B1 | 3/2004 | Bradley |
| 6,726,647 B1 | 4/2004 | Sternby |
| 6,758,836 B2 | 7/2004 | Zawacki |
| 6,780,322 B1 | 8/2004 | Bissler |
| 6,818,196 B2 | 11/2004 | Wong |
| 6,878,283 B2 | 4/2005 | Thompson |
| 6,887,214 B1 | 5/2005 | Levin |
| 6,890,315 B1 | 5/2005 | Levin |
| 6,960,179 B2 | 11/2005 | Gura |
| 7,074,332 B2 | 7/2006 | Summerton |
| 7,077,819 B1 | 7/2006 | Goldau |
| 7,131,956 B1 | 11/2006 | Pirazzoli |
| 7,175,809 B2 | 2/2007 | Gelfand |
| 7,207,946 B2 | 4/2007 | Sirokman |
| 7,208,092 B2 | 4/2007 | Micheli |
| 7,276,042 B2 | 10/2007 | Polaschegg |
| 7,399,289 B2 | 7/2008 | Gelfand |
| 7,404,799 B1 | 7/2008 | Koh |
| 7,500,958 B2 | 3/2009 | Asbrink |
| 7,566,432 B2 | 7/2009 | Wong |
| 7,575,564 B2 | 8/2009 | Childers |
| 7,610,086 B1 | 10/2009 | Ke |
| 7,674,231 B2 | 3/2010 | McCombie |
| 7,704,361 B2 | 4/2010 | Garde |
| 7,736,507 B2 | 6/2010 | Wong |
| 7,744,553 B2 | 6/2010 | Kelly |
| 7,754,852 B2 | 7/2010 | Burnett |
| 7,756,572 B1 | 7/2010 | Fard |
| 7,775,983 B2 | 8/2010 | Zhang |
| 7,775,986 B2 | 8/2010 | Roeher |
| 7,776,210 B2 | 8/2010 | Rosenbaum |
| 7,785,463 B2 | 8/2010 | Bissler |
| 7,794,141 B2 | 9/2010 | Perry |
| 7,850,635 B2 | 12/2010 | Polaschegg |
| 7,857,976 B2 | 12/2010 | Bissler |
| 7,867,214 B2 | 1/2011 | Childers |
| 7,896,831 B2 | 3/2011 | Sternby |
| 7,922,686 B2 | 4/2011 | Childers |
| 7,922,911 B2 | 4/2011 | Micheli |
| 7,947,179 B2 | 5/2011 | Rosenbaum |
| 7,955,291 B2 | 6/2011 | Sternby |
| 7,967,022 B2 | 6/2011 | Grant |
| 7,981,082 B2 | 7/2011 | Wang |
| 8,034,161 B2 | 10/2011 | Gura |
| 8,070,709 B2 | 12/2011 | Childers |
| 8,096,969 B2 | 1/2012 | Roberts |
| 8,105,260 B2 | 1/2012 | Tonelli |
| 8,183,046 B2 | 5/2012 | Lu |
| 8,187,250 B2 | 5/2012 | Roberts |
| 8,197,439 B2 | 6/2012 | Wang |
| 8,202,241 B2 | 6/2012 | Karakama |
| 8,246,826 B2 | 8/2012 | Wilt |
| 8,273,049 B2 | 9/2012 | Demers |
| 8,282,828 B2 | 10/2012 | Wallenas |
| 8,292,594 B2 | 10/2012 | Tracey |
| 8,313,642 B2 | 11/2012 | Yu |
| 8,317,492 B2 | 11/2012 | Demers |
| 8,357,113 B2 | 1/2013 | Childers |
| 8,366,316 B2 | 2/2013 | Kamen |
| 8,366,655 B2 | 2/2013 | Kamen |
| 8,394,601 B2 | 3/2013 | Klein |
| 8,404,091 B2 | 3/2013 | Ding |
| 8,409,441 B2 | 4/2013 | Wilt |
| 8,496,809 B2 | 7/2013 | Roger |
| 8,499,780 B2 | 8/2013 | Wilt |
| 8,500,676 B2 | 8/2013 | Jansson |
| 8,512,271 B2 | 8/2013 | Moissl |
| 8,518,260 B2 | 8/2013 | Raimann |
| 8,521,482 B2 | 8/2013 | Akonur |
| 8,535,525 B2 | 9/2013 | Heyes |
| 8,560,510 B2 | 10/2013 | Brueggerhoff |
| 8,580,112 B2 | 11/2013 | Updyke |
| 8,597,227 B2 | 12/2013 | Childers |
| 8,696,626 B2 | 4/2014 | Kirsch |
| 8,903,492 B2 | 12/2014 | Soykan |
| 8,926,542 B2 | 1/2015 | Gerber |
| 9,700,663 B2 | 7/2017 | Burbank |
| 9,907,897 B2 | 3/2018 | Burbank |
| 10,046,100 B2 | 8/2018 | Burbank |
| 10,076,599 B2 | 9/2018 | Eyrard |
| 10,076,735 B2 | 9/2018 | Jansson |
| 10,172,992 B2 | 1/2019 | Neftel |
| 10,173,881 B2 | 1/2019 | Beavis |
| 10,459,459 B2 | 10/2019 | Beavis |
| 10,478,544 B2 | 11/2019 | Friederichs |
| 10,610,630 B2 | 4/2020 | Burbank |
| 2002/0016550 A1 | 2/2002 | Sweeney |
| 2002/0042561 A1 | 4/2002 | Schulman |
| 2002/0112609 A1 | 8/2002 | Wong |
| 2003/0028089 A1 | 4/2003 | Galley |
| 2003/0069481 A1 | 4/2003 | Hervy |
| 2003/0080059 A1 | 5/2003 | Peterson |
| 2003/0097086 A1 | 5/2003 | Gura |
| 2003/0105435 A1 | 6/2003 | Taylor |

(56) References Cited

U.S. PATENT DOCUMENTS

| | | |
|---|---|---|
| 2003/0113931 A1 | 6/2003 | Pan |
| 2003/0114787 A1 | 6/2003 | Gura |
| 2003/0187479 A1 | 10/2003 | Thong |
| 2004/0019312 A1 | 1/2004 | Childers |
| 2004/0060865 A1 | 4/2004 | Callan |
| 2004/0068219 A1 | 4/2004 | Summerton |
| 2004/0099593 A1 | 5/2004 | DePaolis |
| 2004/0121982 A1 | 6/2004 | Martis |
| 2004/0147900 A1 | 7/2004 | Polaschegg |
| 2004/0168969 A1 | 9/2004 | Sternby |
| 2004/0215090 A1 | 10/2004 | Erkkila |
| 2005/0065760 A1 | 3/2005 | Murtfeldt |
| 2005/0113796 A1 | 5/2005 | Taylor |
| 2005/0126961 A1 | 6/2005 | Bissler |
| 2005/0131331 A1 | 6/2005 | Kelly |
| 2005/0126998 A1 | 7/2005 | Childers |
| 2005/0150832 A1 | 7/2005 | Tsukamoto |
| 2005/0214863 A1 | 9/2005 | McDevitt |
| 2005/0234354 A1 | 10/2005 | Rowlandson |
| 2005/0234357 A1 | 10/2005 | Xue |
| 2005/0234381 A1 | 10/2005 | Niemetz |
| 2005/0234534 A1 | 10/2005 | Rowlandson |
| 2005/0236330 A1 | 10/2005 | Nier |
| 2005/0265895 A1 | 12/2005 | Kopelman |
| 2005/0274658 A1 | 12/2005 | Rosenbaum |
| 2006/0025661 A1 | 2/2006 | Sweeney |
| 2006/0025748 A1 | 2/2006 | Ye |
| 2006/0217771 A1 | 2/2006 | Soykan |
| 2006/0058731 A1 | 3/2006 | Burnett |
| 2006/0191850 A1 | 8/2006 | Bosetto |
| 2006/0195064 A1 | 8/2006 | Plahey |
| 2006/0226079 A1 | 10/2006 | Mori |
| 2006/0241709 A1 | 10/2006 | Soykan |
| 2006/0247548 A1 | 11/2006 | Sarkar |
| 2006/0264894 A1 | 11/2006 | Moberg |
| 2007/0007208 A1 | 1/2007 | Brugger |
| 2007/0038138 A1 | 2/2007 | Gill |
| 2007/0066928 A1 | 3/2007 | Lannoy |
| 2007/0073168 A1 | 3/2007 | Zhang |
| 2007/0138011 A1 | 6/2007 | Hofmann |
| 2007/0161113 A1 | 7/2007 | Ash |
| 2007/0175827 A1 | 8/2007 | Wariar |
| 2007/0179431 A1 | 8/2007 | Roberts |
| 2007/0213653 A1 | 9/2007 | Childers |
| 2007/0215545 A1 | 9/2007 | Bissler |
| 2007/0255250 A1 | 11/2007 | Moberg |
| 2007/0276270 A1 | 11/2007 | Tran |
| 2008/0006570 A1 | 1/2008 | Gura |
| 2008/0015487 A1 | 1/2008 | Szamosfalvi |
| 2008/0021337 A1 | 1/2008 | Li |
| 2008/0053905 A9 | 3/2008 | Brugger |
| 2008/0067132 A1 | 3/2008 | Ross |
| 2008/0093276 A1 | 4/2008 | Roger |
| 2008/0200866 A1 | 8/2008 | Prisco |
| 2008/0215247 A1 | 9/2008 | Tonelli |
| 2008/0253427 A1 | 10/2008 | Kamen |
| 2009/0007642 A1 | 1/2009 | Busby |
| 2009/0020471 A1 | 1/2009 | Tsukamoto |
| 2009/0036825 A1 | 2/2009 | Petersen |
| 2009/0101577 A1 | 4/2009 | Fulkerson |
| 2009/0124869 A1 | 5/2009 | Hu |
| 2009/0124963 A1 | 5/2009 | Hogard |
| 2009/0127193 A1 | 5/2009 | Updyke |
| 2009/0149776 A1 | 6/2009 | Adams |
| 2009/0171261 A1 | 7/2009 | Sternby |
| 2009/0264776 A1 | 10/2009 | Vardy |
| 2009/0275849 A1 | 11/2009 | Stewart |
| 2009/0275883 A1 | 11/2009 | Chapman |
| 2009/0281484 A1 | 11/2009 | Childers |
| 2009/0282980 A1 | 11/2009 | Gura |
| 2009/0314063 A1 | 12/2009 | Sternby |
| 2010/0004588 A1 | 1/2010 | Yeh |
| 2010/0010425 A1 | 1/2010 | Yu |
| 2010/0010429 A1 | 1/2010 | Childers |
| 2010/0042035 A1 | 2/2010 | Moissl |
| 2010/0076398 A1 | 3/2010 | Scheurer |
| 2010/0078381 A1 | 4/2010 | Merchant |
| 2010/0078387 A1 | 4/2010 | Wong |
| 2010/0084330 A1 | 4/2010 | Wong |
| 2010/0087771 A1 | 4/2010 | Karakama |
| 2010/0094158 A1 | 4/2010 | Solem |
| 2010/0113891 A1 | 5/2010 | Barrett |
| 2010/0114012 A1 | 5/2010 | Sandford |
| 2010/0137693 A1 | 6/2010 | Porras |
| 2010/0137782 A1 | 6/2010 | Jansson |
| 2010/0168546 A1 | 7/2010 | Kamath |
| 2010/0217180 A1 | 8/2010 | Akonur |
| 2010/0217181 A1 | 8/2010 | Roberts |
| 2010/0224492 A1 | 9/2010 | Ding |
| 2010/0234795 A1 | 9/2010 | Wallenas |
| 2010/0241045 A1 | 9/2010 | Kelly |
| 2010/0264086 A1 | 10/2010 | Noack |
| 2010/0312172 A1 | 12/2010 | Hoffman |
| 2011/0017665 A1 | 1/2011 | Updyke |
| 2011/0048949 A1 | 3/2011 | Ding et al. |
| 2011/0066006 A1 | 3/2011 | Banet |
| 2011/0066043 A1 | 3/2011 | Banet |
| 2011/0071465 A1 | 3/2011 | Wang |
| 2011/0077574 A1 | 3/2011 | Sigg |
| 2011/0077575 A1 | 3/2011 | Kraemer |
| 2011/0079558 A1 | 4/2011 | Raimann |
| 2011/0081728 A1 | 4/2011 | Putnam |
| 2011/0087187 A1 | 4/2011 | Beck |
| 2011/0088484 A1* | 4/2011 | Camilleri ............... G01F 1/34 |
| | | 73/861.42 |
| 2011/0100909 A1 | 5/2011 | Stange |
| 2011/0106003 A1 | 5/2011 | Childers |
| 2011/0130666 A1 | 6/2011 | Dong |
| 2011/0137136 A1 | 6/2011 | Kotanko |
| 2011/0141116 A1 | 6/2011 | Dalesch |
| 2011/0144570 A1 | 6/2011 | Childers |
| 2011/0184340 A1 | 7/2011 | Tan |
| 2011/0208105 A1 | 8/2011 | Brandl |
| 2011/0272337 A1 | 11/2011 | Palmer |
| 2011/0301447 A1 | 12/2011 | Park |
| 2011/0301472 A1 | 12/2011 | Grober |
| 2012/0016228 A1 | 1/2012 | Kroh |
| 2012/0029937 A1 | 2/2012 | Neftel |
| 2012/0083729 A1 | 4/2012 | Childers |
| 2012/0085707 A1 | 4/2012 | Beiriger |
| 2012/0115248 A1 | 5/2012 | Ansyln |
| 2012/0135396 A1 | 5/2012 | McDevitt |
| 2012/0181230 A1 | 7/2012 | Kloeffel |
| 2012/0220528 A1 | 8/2012 | VanAntwerp |
| 2012/0258545 A1 | 10/2012 | Ash |
| 2012/0258546 A1 | 10/2012 | Marran |
| 2012/0259276 A1 | 10/2012 | Childers |
| 2012/0273354 A1 | 11/2012 | Orhan et al. |
| 2012/0273415 A1 | 11/2012 | Gerber |
| 2012/0273420 A1 | 11/2012 | Gerber |
| 2012/0277546 A1 | 11/2012 | Soykan |
| 2012/0277551 A1 | 11/2012 | Gerber |
| 2012/0277552 A1 | 11/2012 | Gerber |
| 2012/0277604 A1 | 11/2012 | Gerber |
| 2012/0277650 A1 | 11/2012 | Gerber |
| 2012/0277655 A1 | 11/2012 | Gerber |
| 2012/0277722 A1 | 11/2012 | Gerber |
| 2012/0283581 A1 | 11/2012 | Olde et al. |
| 2012/0303079 A1 | 11/2012 | Mahajan |
| 2013/0037465 A1 | 2/2013 | Heyes |
| 2013/0062265 A1 | 3/2013 | Balschat |
| 2013/0116578 A1 | 5/2013 | QiAn |
| 2013/0158461 A1 | 6/2013 | Sasaki |
| 2013/0168316 A1 | 7/2013 | Noguchi |
| 2013/0186759 A1 | 7/2013 | Lin |
| 2013/0193073 A1 | 8/2013 | Hogard |
| 2013/0199998 A1 | 8/2013 | Kelly |
| 2013/0211730 A1 | 8/2013 | Wolff |
| 2013/0213890 A1 | 8/2013 | Kelly |
| 2013/0228517 A1 | 9/2013 | Roger |
| 2013/0231607 A1 | 9/2013 | Roger |
| 2013/0248426 A1 | 9/2013 | Pouchoulin |
| 2013/0274642 A1 | 10/2013 | Soykan |
| 2013/0324915 A1 | 12/2013 | (Krensky)Britton |

(56) References Cited

U.S. PATENT DOCUMENTS

| | | |
|---|---|---|
| 2013/0330208 A1 | 12/2013 | Ly |
| 2013/0331774 A1 | 12/2013 | Farrell |
| 2014/0018727 A1 | 1/2014 | Burbank |
| 2014/0018728 A1 | 1/2014 | Plahey |
| 2014/0042092 A1 | 2/2014 | Akonur |
| 2014/0065950 A1 | 3/2014 | Mendelsohn |
| 2014/0088442 A1 | 3/2014 | Soykan |
| 2014/0276375 A1 | 3/2014 | Minkus |
| 2014/0110340 A1 | 4/2014 | White |
| 2014/0110341 A1 | 4/2014 | White |
| 2014/0158538 A1 | 6/2014 | Collier |
| 2014/0158588 A1 | 6/2014 | Pudil |
| 2014/0158623 A1 | 6/2014 | Pudil |
| 2014/0190876 A1 | 7/2014 | Meyer |
| 2014/0216250 A1 | 8/2014 | Meyer |
| 2014/0217028 A1 | 8/2014 | Pudil |
| 2014/0217029 A1 | 8/2014 | Meyer |
| 2014/0217030 A1 | 8/2014 | Meyer |
| 2014/0220699 A1 | 8/2014 | Pudil |
| 2014/0314625 A1 | 10/2014 | Clift |
| 2015/0032023 A1 | 1/2015 | Soykan |
| 2015/0080682 A1 | 3/2015 | Gerber |
| 2015/0088047 A1 | 3/2015 | Gerber |
| 2015/0141512 A1 | 5/2015 | Kizhakkedathu |
| 2015/0144539 A1 | 5/2015 | Pudil |
| 2015/0148697 A1 | 5/2015 | Burnes |
| 2015/0149096 A1 | 5/2015 | Soykan |
| 2015/0211906 A1* | 7/2015 | Skovmose Kallesoe ................. F04D 15/0088 702/45 |
| 2015/0250427 A1 | 9/2015 | Soykan |
| 2015/0343126 A1 | 12/2015 | Merchant |
| 2015/0352269 A1 | 12/2015 | Gerber |
| 2015/0367054 A1 | 12/2015 | Gerber |
| 2016/0018347 A1 | 1/2016 | Drbal |
| 2016/0023467 A1 | 2/2016 | Smith |
| 2016/0143774 A1 | 5/2016 | Burnett |
| 2016/0166753 A1 | 6/2016 | Meyer |
| 2016/0206801 A1 | 7/2016 | Gerber |
| 2016/0331884 A1 | 11/2016 | Sigg |
| 2017/0319768 A1 | 11/2017 | Szpara |
| 2018/0043080 A1 | 2/2018 | Gerber |
| 2018/0221555 A1 | 8/2018 | Rohde |
| 2018/0252566 A1* | 9/2018 | Fjalestad .................. G01F 1/34 |
| 2019/0125952 A1 | 5/2019 | Jansson |
| 2019/0125954 A1 | 5/2019 | Mathiot |
| 2019/0151526 A1 | 5/2019 | Wieslander |
| 2019/0240389 A1 | 8/2019 | Rohde |

FOREIGN PATENT DOCUMENTS

| | | |
|---|---|---|
| CN | 101193667 | 6/2008 |
| CN | 101300476 A | 11/2008 |
| CN | 201342127 | 11/2009 |
| CN | 202048893 | 3/2011 |
| CN | 103394139 | 11/2013 |
| CN | 103619372 | 3/2014 |
| CN | 103751871 | 4/2014 |
| CN | 103717132 | 9/2014 |
| CN | 104174077 | 12/2014 |
| CN | 104271173 | 1/2015 |
| CN | 104833635 A | 8/2015 |
| CN | 104884102 | 9/2015 |
| CN | 105008893 B | 10/2015 |
| CN | 105142692 | 12/2015 |
| CN | 105692957 A | 6/2016 |
| CN | 205672288 | 11/2016 |
| CN | 107206147 | 9/2017 |
| DE | 3224823 | 1/1984 |
| DE | 102006028172 A1 | 12/2017 |
| EP | 0266795 A2 | 11/1987 |
| EP | 0402505 | 12/1990 |
| EP | 0272414 | 10/1991 |
| EP | 0330892 | 7/1994 |
| EP | 1124599 | 5/2000 |
| EP | 1175238 | 11/2000 |
| EP | 1085295 | 11/2001 |
| EP | 1281351 | 2/2003 |
| EP | 2308526 | 10/2003 |
| EP | 1364666 A1 | 11/2003 |
| EP | 1523347 | 1/2004 |
| EP | 1523350 | 1/2004 |
| EP | 0906768 B1 | 2/2004 |
| EP | 1691863 | 4/2005 |
| EP | 2116269 | 2/2008 |
| EP | 1450879 | 10/2008 |
| EP | 1514562 | 4/2009 |
| EP | 2219703 | 5/2009 |
| EP | 1592494 B1 | 6/2009 |
| EP | 2398529 | 11/2010 |
| EP | 2575827 A2 | 12/2010 |
| EP | 2100553 | 8/2011 |
| EP | 2576453 A2 | 12/2011 |
| EP | 2701580 | 11/2012 |
| EP | 2701595 | 11/2012 |
| EP | 1345856 B1 | 3/2013 |
| EP | 2344220 B1 | 4/2013 |
| EP | 1351756 | 7/2013 |
| EP | 2190498 | 7/2013 |
| EP | 2701596 | 3/2014 |
| EP | 1582226 | 1/2016 |
| JP | S55138462 | 10/1980 |
| JP | S63-143077 | 11/1987 |
| JP | 2002533170 | 10/2002 |
| JP | 2002542900 | 12/2002 |
| JP | 2003235965 | 8/2003 |
| JP | 2005-533573 | 11/2005 |
| JP | 5-99464 | 10/2012 |
| WO | WO1992005814 | 4/1992 |
| WO | 1995003839 | 2/1995 |
| WO | WO 1998054563 | 12/1998 |
| WO | WO1999006082 | 2/1999 |
| WO | 9937342 | 7/1999 |
| WO | 0057935 | 10/2000 |
| WO | 2000066197 | 11/2000 |
| WO | 200170307 A1 | 9/2001 |
| WO | 2001085295 A2 | 9/2001 |
| WO | 0185295 A2 | 11/2001 |
| WO | 2002013691 | 2/2002 |
| WO | WO 20020053211 | 7/2002 |
| WO | 2003043677 A2 | 5/2003 |
| WO | 2003043680 | 5/2003 |
| WO | 2003051422 A2 | 6/2003 |
| WO | 2004008826 | 1/2004 |
| WO | 2004009156 | 1/2004 |
| WO | 2004009158 | 1/2004 |
| WO | 2004030716 A2 | 4/2004 |
| WO | 2004030717 A2 | 4/2004 |
| WO | 2004064616 A2 | 8/2004 |
| WO | 2005033701 | 4/2005 |
| WO | 2005061026 | 7/2005 |
| WO | 2005123230 A2 | 12/2005 |
| WO | 2006011009 | 2/2006 |
| WO | 2006017446 | 2/2006 |
| WO | 2007038347 | 4/2007 |
| WO | 2007089855 A2 | 8/2007 |
| WO | WO2009094035 A1 | 1/2008 |
| WO | 2008037410 | 4/2008 |
| WO | 2009026603 | 12/2008 |
| WO | 2009024566 | 2/2009 |
| WO | 2009061608 | 5/2009 |
| WO | 2009094184 | 7/2009 |
| WO | 2009157877 A1 | 12/2009 |
| WO | 2009157878 A1 | 12/2009 |
| WO | WO2009154955 A2 | 12/2009 |
| WO | 2010024963 | 3/2010 |
| WO | 2010028860 | 3/2010 |
| WO | 2010033314 | 3/2010 |
| WO | 2010033699 | 3/2010 |
| WO | 2010077851 | 7/2010 |
| WO | 2010096659 | 10/2010 |
| WO | 2010121820 | 10/2010 |
| WO | 2011025705 A1 | 3/2011 |

(56) References Cited

FOREIGN PATENT DOCUMENTS

| WO | 2011026645 | 3/2011 |
|---|---|---|
| WO | WO2013022760 A1 | 8/2011 |
| WO | WO 2011/132046 | 10/2011 |
| WO | 2011137693 | 11/2011 |
| WO | WO2011161056 | 12/2011 |
| WO | 2012042323 | 4/2012 |
| WO | 2012050781 | 4/2012 |
| WO | 2012051996 | 4/2012 |
| WO | 2012073420 | 7/2012 |
| WO | WO 2012/129501 | 9/2012 |
| WO | 2012148781 | 11/2012 |
| WO | 2012148784 | 11/2012 |
| WO | 2012148786 | 11/2012 |
| WO | 2012148787 A1 | 11/2012 |
| WO | 2012148789 | 11/2012 |
| WO | 2012162515 A2 | 11/2012 |
| WO | WO2012148788 A1 | 11/2012 |
| WO | WO 20120148784 | 11/2012 |
| WO | 2012172398 | 12/2012 |
| WO | 2013019179 A1 | 2/2013 |
| WO | 2013019994 A2 | 2/2013 |
| WO | 2013025844 | 2/2013 |
| WO | 2013028809 A3 | 2/2013 |
| WO | 103037917 | 4/2013 |
| WO | 2013101292 | 7/2013 |
| WO | 2013103607 A1 | 7/2013 |
| WO | 2013103906 | 7/2013 |
| WO | 2013110906 | 8/2013 |
| WO | 2013110919 | 8/2013 |
| WO | 2013114063 A1 | 8/2013 |
| WO | 2013121162 A1 | 8/2013 |
| WO | 2013140346 | 9/2013 |
| WO | 2013141896 | 9/2013 |
| WO | 2013101292 A3 | 10/2013 |
| WO | 14066254 | 5/2014 |
| WO | 14066255 | 5/2014 |
| WO | 14077082 | 5/2014 |
| WO | 2014121162 | 8/2014 |
| WO | 2014121163 | 8/2014 |
| WO | 2014121167 | 8/2014 |
| WO | 2014121169 | 8/2014 |
| WO | WO2014121161 | 8/2014 |
| WO | WO2015081221 A1 | 6/2015 |
| WO | WO 20150159280 | 10/2015 |
| WO | WO2016049542 | 3/2016 |
| WO | WO 20160080883 | 5/2016 |
| WO | WO 20170034452 | 3/2017 |
| WO | WO 2017/176687 | 10/2017 |
| WO | WO 2017/176701 | 10/2017 |
| WO | WO2018229125 | 12/2018 |

OTHER PUBLICATIONS

F. Locatelli, et al: "Haemodialysis with on-line monitoring equipment: tools or toys?" Nephrology Dialysis Transplantation., vol. 20, No. 1, Jan. 1, 2005.
Heiko Hickstein, et al; "Clinical application of fuzzy-controlled blood pressure stabilization in patients prone to hypotension duirng hemodiaylsis", Dyalysis & Transplantation, vol. 38, No. 2, Feb. 1, 2009, pp. 58-64.
Henderson, et al, "Online Preparation of Sterile Pyrogen-Free Electrolyte Solution," Trans. Am. Soc. Artif.Intern.Organs, 1978 pp. 465-467.
Laurent, Jeanpierre, "Continuous Monitoring of Dynamic Systems: Application to Monitoring of Dialyzed Patients" Oct. 30, 2004, received from internet: http://laurent.jeanpierre1.free.fr/recherche/papiers/aista2004.pdf.
[NPL105] Brynda, et. al., The detection of toman 2-microglcbuiin by grating coupler immunosensor with three dimensional antibody networks. Biosensors & Bioelectronics, 1999, 363-368, 14(4).
[NPL10] Wheaton, et al., Dowex Ion Exchange Resins—Fundamentals of Ion Exchange; Jun. 2000, pp. 1-9 http://www.dow.com/scripts/litorder.asp?filepath=liquidseps/pdfs/noreg/177-01837.pdf.
[NPL111] Zhong, et. al., Miniature urea sensor based on H(+)-ion sensitive field effect transistor and its application in clinical analysis, Chin. J. Biotechnol., 1992, 57-65. 8(1).
[NPL121] Roberts M, The regenerative dialysis (REDY) sorbent system. Nephrology, 1998, 275-278:4.
[NPL142] Hemametrics, Crit-Line Hematocrit Accuracy, 2003, 1-5, vol. 1, Tech Note No. 11 (Rev. D).
[NPL144] Weissman, S., et al., Hydroxyurea-induced hepatitis in human immunodeficiency virus-positive patients. Clin. Infec. Dis, (Jul. 29, 1999): 223-224.
[NPL14] Foley, et al., Long Interdialytic Interval and Martality among Patients Receiving Hemodialysis, N Engl Jrnl Med. 2011:365(12):1099-1107.
[NPL169] Wang, Fundamentals of intrathoracic impedance monitoring in heart failure, Am. J. Cardiology, 2007, 3G-10G: Suppl.
[NPL170] Bleyer, et al., Kidney International. Jun. 2006; 69(12):2268-2273.
[NPL176] Bleyer, et. al., Sudden and cardiac death rated in hemodialysis patients, Kidney International. 1999, 1553-1559: 55.
[NPL205] Culleton, BF et al. Effect of Frequent Nocturnal Hemodialysis vs. Conventional Hemodialysis on Left Ventricular Mass and Quality of Life. 2007 Journal of the American Medical Association 298 (11), 1291-1299.
[NPL230] Redfield, et. al., Restoration of renal response to atria! natriuretic factor in experimental low-output heat failure, Am. J. Physiol., Oct. 1, 1989, R917-923:257.
[NPL231] Rogoza, et. al., Validation of A&D UA-767 device for the self-measurement of blood pressure, Blood Pressure Monitoring, 2000, 227-231, 5(4).
[NPL234] Lima, et. al., An electrochemical sensor based on nanostructure hollandite-type manganese oxide for detection of potassium ion, Sensors, Aug. 24, 2009, 6613-8625, 9.
[NPL235] Maclean, et, al., Effects of hindlimb contraction on pressor and muscle interstitial metabolite responses in the cat, J. App. Physiol., 1998, 1583-1592, 85(4).
[NPL268] Ronco et al. 2008, Cardiorenal Syndrome, Journal American College Cardiology, 52:1527-1539, Abstract.
[NPL26] Overgaard, et. al., Activity-induced recovery of excitability in K+-depressed rat soleus muscle, Am. J. P 280: R48-R55, Jan. 1, 2001.
[NPL27] Overgaard et. al., Relations between excitability and contractility in rate soleusmuscle: role of the NA+-K+ pump and NA+-K-S gradients. Journal of Physiology, 1999, 215-225, 518(1).
[NPL285] Zoccali, Pulmonary Congestion Predicts Cardiac Events and Mortality in ESRD, Clinical Epidemiology, J. Am Soc Nephrol 24:639-646, 2013.
[NPL306] Coast, et al. 1990, An approach to Cardiac Arrhythmia analysis Using Hidden Markov Models, IEEE Transactions On Biomedical Engineering. 1990, 37(9):826-835.
[NPL309] Weiner, et. al., Article: Cardiac Function and Cardiovascular Disease in Chronic Kidney Disease, Book: Primer on Kidney Diseases (Author: Greenberg, et al.), 2009,499-505, 5th Ed., Saunders Elsevier, Philadelphia, PA.
[NPL322] Velasco, Optimal Fluid Control can Normalize Cardiovascular Risk Markers and Limit Left Ventricular Hypertrophy in Thrice Weekly Dialysis Patients, Hemodialysis Intenational, 16:465-472, 2012.
[NPL323] Whitman, CKD and Sudden Cardiac Death: Epidemiology, Mechanisms, and Therapeutic Approaches, J Am Soc Nephrol, 23:1929-1939, 2012.
[NPL324] Hall, Hospitalization for Congestive Heart Failure: United States, 2000-2010, NCHS Data Brief, No. 108, Oct. 2012.
[NPL325] Albert, Fluid Management Strategies in Heart Failure, Critical Care Nurse, 32:20-32, 2012.
[NPL328] Genovesi, et al., Nephrology, Dialysis, Transplantation 2009; 24(8):2529-2536.
[NPL32] Secemsky, et. al., High prevalence of cardiac autonomic dysfunction and T-wave alternans in dialysis patients. Heart Rhythm, Apr. 2011, 592-598 : vol. 8, No. 4.

(56) References Cited

OTHER PUBLICATIONS

[NPL35] Wei, et. al., Fullerene-cryptand coated piezoelectric crystal urea sensor based on urease, Analytica Chimica Acta, 2001,77-85:437.
[NPL376] Gambro AK 96 Dialysis Machine Operators Manual, Dec. 2012. p. 1-140.
[NPL376] Gambro AK 96 Dialysis Machine Operators Manual, Dec. 2012. p. 141-280.
[NPL376] Gambro AK 96 Dialysis Machine Operators Manual, Dec. 2012. p. 281-420.
[NPL376] Gambro AK 96 Dialysis Machine Operators Manual, Dec. 2012. p. 421-534.
[NPL383] Leifer et al., A Study on the Temperature Variation of Rise Velocity for Large Clean Bubbles, J. Atmospheric & Oceanic Tech., vol. 17, pp. 1392-1402, Oct. 2000.
[NPL384] Talaia, Terminal Velocity of a Bubble Rise in a Liquid Column World Acad. of Sci., Engineering & Tech., vol. 28, pp. 264-268, Published Jan. 1, 2007.
[NPL386] The FHN Trial Group. In-Center. Hemodialysis Six Times per Week versus Three Times per Week, New England Journal of Medicine, 2010 Abstract.
[NPL46] Siegenthaler, et al., Pulmonary fluid status monitoring with intrathoracic impedance, Journal of Clinical Monitoring and Computing, 24:449-451, published Jan. 12, 2011.
[NPL494] John Wm Agar: Review: Understanding sorbent dialysis systems, Nephrology, vol. 15, No. 4, Jun. 1, 2010, pp. 406-411.
[NPL632] Lakerveld et al., Primary prevention of diabetes mellitus type 2 and cardiovascular diseases using a cognitive behavior program aimed at lifestyle changes in people at risk: Design of a randomized controlled trial, 2008, BMC Endocrine Disorders, 8(6): 1-19.
[NPL633] Gordhandas et al, Real-Time Extraction and Analysis of Key Morphological Features in the Electrocardiogram, for Data Compression and Clinical Decision Support, 2004, Computational Physiology, pp. 15-18.
[NPL90] Nedelkov, et. al., Design of buffer exchange surfaces and sensor chips for biosensor chip mass spectrometry, Proteomics, 2002, 441-446, 2(4).
[NPL] Green et al., Sudden Cardiac Death in Hemodialysis Patients: an In-Depth Review , Am J Kidney Dis 57(6)921:929; published Apr. 18, 2011.
[NPL] Rajan et al. Generalized Feature Extraction for Time-Varying Autoregressive Models, IEEE Transacion Signal Processing vol. 44, No. 10; published Oct. 1, 1996.
Castellanos, et al., Clinical Relevance of Intraperitoneal Pressure in Peritoneal Dialysis Patients, Perit Dial Int. Sep.-Oct. 2017;37(5):562-567. doi: 10.3747/pdi.2016.00267. Epub Jul. 11, 2017.
Wollenstein, et al, "Colorimetric gas sensors for the detection of ammonia, nitrogen dioxide, and carbon monoxide: current status and research trends", Sensor and Test Conference 2011, Jan. 2, 2011, pp. 562-567.

* cited by examiner

DETERMINING FLUID FLOW ACROSS ROTARY PUMP

FIELD

Systems, devices, and methods are provided for sensing the flow of liquid within a device in which liquid flows, and particularly in connection with a pump for active transport of the liquid. Parameters such as current drawn, pressure, and temperature can be used to accurately and precisely measure fluid flow in a contactless manner. A model can be used to determine the fluid flow using the measured current drawn by the pump, inlet pressure, outlet pressure, pump rotational speed, and fluid density as independent variables.

BACKGROUND

Conventional devices transporting fluid regulate an amount of liquid that is held and moved for proper functioning of the device. Conventional approaches require calculating flow rates using volumetric or sensor control. In medical applications, the conventional devices administer fluids to patients and regulate how much and how quickly the fluids are delivered using contact measurements such as balance chambers or non-contact measurements such as ultrasonic time-in-transient measurements. Devices that involve admixture of different components to generate a desired result also regulate an amount of each liquid component. Conventional fluid transport mechanisms often use volumetric control as part of the pump mechanism to monitor the flow rate across the pump. Usually, volumetric control uses two identical chambers that are each divided in half by a flexible membrane wherein the system has an inlet and outlet. However, each chamber is a source of error in volumetric control and increases the potential for fluid contamination. Another approach uses load cells to measure weight changes of a fluid container. However, this method is limited to net flow. Another conventional method for fluid regulation relies on counting the rotations of a rotary pump to determine an amount of fluid being pumped. However, the conventional systems and methods using rotary pumps are often inaccurate or imprecise. The problem is exacerbated in medical devices that mix fluid components requiring a high degree of accuracy and precision. Moreover, certain applications require contactless measurement of fluid rates to avoid contamination of medical fluid or to support measurement of hazardous or chemical fluids that might be used to clean or disinfect a medical device. Some of the known devices use non-intrusive sensors such as ultrasonic or optical sensors. However, the known non-intrusive sensors are specific to, and dependent on the specific properties of the fluid being transported, and often cannot reliably sense the movement of fluid in all cases. This can be problematic where admixtures of different fluid components are pumped and mixed in a medical fluid.

As such, there is a need for systems, methods, and components that can reliably measure flow rates with appropriate accuracy and precision. The need also includes obtaining measurement using contactless systems, methods, and components. The need still further includes systems, methods, and components that can use a parameter such as pump speed in conjunction with other data gathered from non-intrusive sensors already available within fluid sensing methodology to determine the fluid flow accurately and precisely across a pump. The need includes accurately and precisely monitoring the fluid flow across the rotary pump of a fluid transport system. The need extends to systems, components, and methods for obtaining additional parameters such as pressure, power consumption, and fluid density to model the fluid flow. The need includes a non-contact flow sensing methodology. The need still includes non-contact systems, methods, and components that can determine fluid flow rates of chemical or hazardous liquid. The need also includes systems, methods, and components having high safety and that can determine the mechanical or electrical load on a pump or uneven loading in the system.

SUMMARY OF THE INVENTION

The problem to be solved is to monitor the fluid flow accurately and precisely without contacting the measured fluid. The solution is to model the fluid flow using the measured current drawn by the pump, inlet pressure, outlet pressure, pump rotational speed, and fluid density as independent variables and using the model to obtain the flow rate.

The first aspect of the invention relates to a system for fluid flow. In any embodiment, the system can include a rotary pump; an inflow line and an outflow line in fluid communication with the rotary pump; an inlet pressure sensor at the inflow line; an outlet pressure sensor at the outflow line; a current sensor measuring the current drawn by the rotary pump; and a circuit calculating fluid flow rate through the system based on a density value for a fluid pumping through the system, rotational speed of the rotary pump, inlet pressure at the inflow line, outlet pressure at the outflow line, and current drawn by the rotary pump.

In any embodiment, the system can further include a temperature sensor measuring a temperature of the fluid pumping through the system, the density value for the fluid determined from the measured temperature.

In any embodiment, the inlet pressure sensor, the outlet pressure sensor, and the temperature sensor can each be non-intrusive sensors.

In any embodiment, the fluid can be peritoneal dialysis fluid. The density value for the liquid can be a known value for the density of peritoneal dialysis fluid at the measured temperature.

In any embodiment, the rotary pump can include a driver controlling the rotational speed of the rotary pump, the driver communicating the rotational speed of the rotary pump to the circuit calculating the liquid flow rate through the system.

In any embodiment, the circuit can determine a resistance for the rotary pump based on the rotational speed of the rotary pump and the current drawn by the rotary pump, the determined resistance relating a known voltage of the rotary pump to the drawn current.

In any embodiment, the circuit can relate fluid flow, Q, to an area A within the inflow line and a velocity v of fluid flow within the inflow line according to the equation: $Q=A*v$.

In any embodiment, the circuit can relate fluid flow, Q, to an area A within the outflow line and a velocity v of fluid flow within the outflow line according to the equation: $Q=A*v$.

In any embodiment, the circuit can relate the inlet pressure, $p_o$, the outlet pressure, $p_i$, and the fluid density value, $\rho$, according to the equation: $v_i^2/2+g*h_i+p_i/\rho=v_o^2/2+g*h_o+p_o/\rho$; where $v_i$ is the velocity of fluid flow within the inflow line, $v_o$ is the velocity of flow within the outflow line, g is the acceleration due to gravity, $h_i$ is the height of the inflow line, and $h_o$ is the height of the outflow line.

The features disclosed as being part of the first aspect of the invention can be in the first aspect of the invention, either alone or in combination, or follow any arrangement or permutation of any one or more of the described elements. Similarly, any features disclosed as being part of the first aspect of the invention can be in the second aspect of the invention described below, either alone or in combination, or follow any arrangement or permutation of any one or more of the described elements.

The second aspect of the invention relates to a method for determining fluid flow across a rotary pump. In any embodiment, the method can include the step of calculating a fluid flow rate based on a rotational speed of the rotary pump, a measured pressure difference between a fluid intake and fluid discharge across the rotary pump, a determined density value for the fluid, and a measured current drawn by the rotary pump.

In any embodiment, the method can further include the steps of calculating a pressure difference between the fluid inflow line and the fluid outflow line based on a measured suction pressure at a fluid inflow line in fluid communication with the rotary pump and a discharge pressure at a fluid outflow line in fluid communication with the rotary pump.

In any embodiment, the method can further include the steps of measuring the current, I, drawn by the rotary pump; comparing the drawn current and a known voltage, V, of the rotary pump to the rotational speed of the rotary pump to determine a resistance, R, for the rotary pump according to the following equation: $V=I*R$; wherein the fluid flow is calculated based on the determined resistance.

In any embodiment, the method can further include the step of displaying the calculated fluid flow rate.

In any embodiment, the density value for fluid moving across the rotary pump can be determined by measuring a temperature for the fluid and calculating the density based on the measured temperature.

In any embodiment, the rotational speed of the rotary pump can be measured by a driver regulating the speed of the rotary pump.

In any embodiment, calculating the fluid flow, Q, can include relating to an area A within the inflow line and a velocity v of fluid flow within the inflow line according to the equation: $Q=A*v$.

In any embodiment, calculating the fluid flow, Q, can include relating to an area A within the outflow line and a velocity v of fluid flow within the outflow line according to the equation: $Q=A*v$.

In any embodiment, the method can include the step of relating the inlet pressure, $p_o$, the outlet pressure, $p_i$, and the fluid density value, $\rho$, according to the equation: $v_i^2/2+g*h_i+p_i/\rho=v_o^2/2+g*h_o+p_o/\rho$; where $v_i$ is the velocity of fluid flow within the inflow line, $v_o$ is the velocity of flow within the outflow line, g is the acceleration due to gravity, $h_i$ is the height of the inflow line, and $h_o$ is the height of the outflow line.

In any embodiment, the method can further include the steps of applying current drawn by the rotary pump and temperature of the fluid as independent variables in modeling the fluid flow across the pump; and calculating the fluid flow based on the modeling.

In any embodiment, measured suction pressure at an inflow line and measured discharge pressure at an outflow line can also be independent variables in modeling the fluid flow across the pump.

In any embodiment, the rotational speed of the rotary pump can also be an independent variable in modeling the fluid flow across the pump.

The features disclosed as being part of the second aspect of the invention can be in the second aspect of the invention, either alone or in combination, or follow any arrangement or permutation of any one or more of the described elements. Similarly, any features disclosed as being part of the second aspect of the invention can be in the first, aspect of the invention described above, either alone or in combination, or follow any arrangement or permutation of any one or more of the described elements.

DETAILED DESCRIPTION

Figure 1:
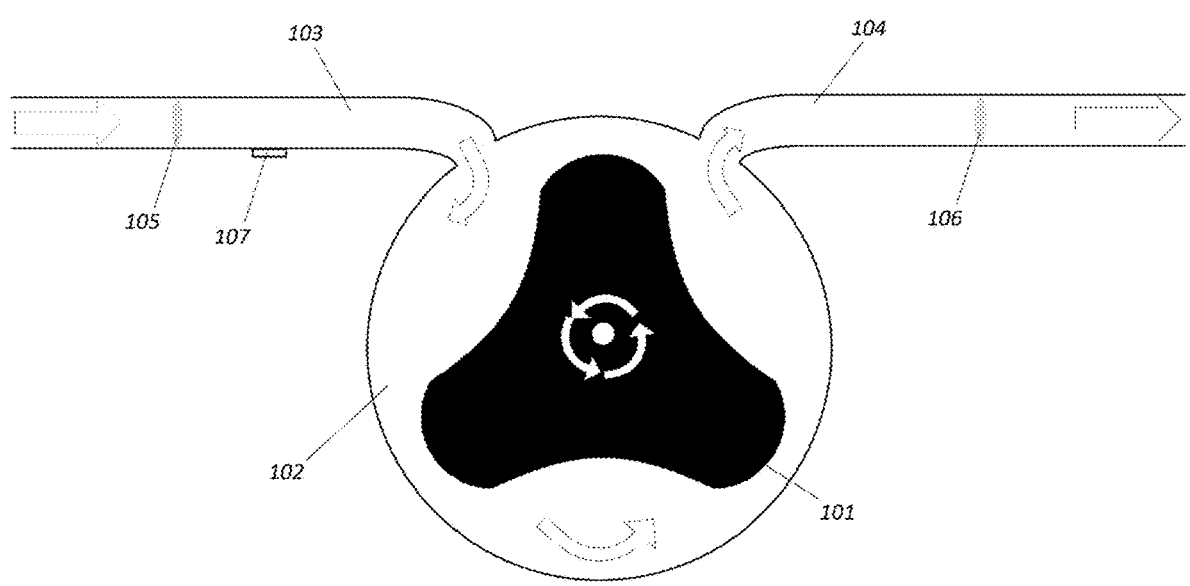
FIG. 1 is a cross-sectional view of a portion of a fluid transport system.

Unless defined otherwise, all technical and scientific terms used have the same meaning as commonly understood by one of ordinary skill in the art.

The articles "a" and "an" are used to refer to one to over one (i.e., to at least one) of the grammatical object of the article. For example, "an element" means one element or over one element.

To "associate" means to identify one piece of information as related to a second piece of information.

To "calculate," "calculating," and the like means to determine a particular value by applying one or more equations and/or functions to one or more values.

A "circuit" is a component of a system that is in electrical communication with other components. A circuit can be a processor, controller, or other electronic or digital component that sends, receives, and/or processes electronic data, instructions, and/or information.

The terms "communication," "communicate," "communicating," and the like can refer to the ability to transmit electronic data, instructions, information wirelessly, via direct electrical connection, or any other electrical transmission means between one or more components.

The terms "compare," "comparing," and the like means to determine whether two files or data are the same or different. A difference between the two file or data can be obtained by the comparison.

The term "comprising" includes, but is not limited to, whatever follows the word "comprising." Use of the term indicates the listed elements are required or mandatory but that other elements are optional and may be present.

The term "consisting of" includes and is limited to whatever follows the phrase "consisting of." The phrase indicates the limited elements are required or mandatory and that no other elements may be present.

The term "consisting essentially of" includes whatever follows the term "consisting essentially of" and additional elements, structures, acts or features that do not affect the basic operation of the apparatus, structure or method described.

A "controller" or "driver" is a device capable of sending signals to manage the operation of one or more devices in a system. A single component, such as a processor, circuit, or other device, may be a controller or driver for more than one component of a system.

"Current" is a measure of electricity drawn by a device. Any movement of electrical charge within a system is considered current.

A "current sensor" is a device capable of measuring the current flow across any electrical component of a system, either directly or indirectly. Devices that use other quantities of electrical circuits such as resistance, voltage, power, and/or heat to indirectly determine current are also considered current sensors if they calculate and/or report current measurements as part of their regular function.

"Density" or "fluid density" is the proportion of a fluid's mass to volume. The density of a fluid can vary based on other properties of the fluid, such as temperature and pressure. A "density value" is a measurement or calculation of density.

The term "device," as used herein, refers to any device that can authenticate a user or USB authentication device.

The term "determining" or to "determine" refers to ascertaining a particular state of a component or system.

The term "device" is to be interpreted in the broadest sense and can include anything made for a particular purpose, a contrivance of any type, particularly a mechanical or electrical component or hardware. Some examples of devices can include a medical device such as a dialysis machine, laptop, computer, computer peripherals of any type, computer terminals, portable devices, smart phones, and smart watches.

A "dialysis system" is a collection of medical devices used to provide dialysis treatment to one or more patients.

The term "execute" means to perform a step or series of steps.

The terms "flowing" or to "flow" "refer to the movement of a fluid.

A "fluid" is a substance in a liquid and/or gaseous phase. A liquid substance having a combination of gas and liquid phases is a fluid. Notably, a liquid, as used herein, can therefore also have a mixture of gas and liquid phases of matter.

A "fluid characteristic" is any sensed characteristic of a fluid, including temperature, pressure, concentration, or any other characteristic.

The term "fluid communication" means that two chambers are connected, either directly or indirectly, with or without intervening elements such as valves, membranes, stoppers, or the like, so that fluid flows from one chamber into another. Chambers are in "fluid communication" whether or not the fluid flows in both directions.

A "fluid flow path" refers to a pathway through which a fluid, gas, and combinations thereof can travel.

An "inflow line" or "fluid inlet" refers to a refers to a conduit or opening through which fluid, gas, and combinations thereof can enter a component or apparatus.

"Inlet pressure" is pressure measured at a fluid inlet.

A component is "intrusive" if positioned within a chamber for holding or transporting liquid such that the component will come in physical contact with the liquid.

The term "medical device" refers to a device used to perform medical treatment or diagnosis of any type.

To "measure," "measuring," and the like, to determine a quantifiable property of a component or system. The measured or sensed property or parameter can be obtained via a sensor of any type known to those of ordinary skill.

A system or method is "non-intrusive" if containing no intrusive components—that is, if every component of the system or used to implement the method is positioned outside of the chambers where liquid is transported and stored so that none of the components come in physical contact with the liquid.

An "outflow line" or "fluid outlet" refers to a refers to a conduit or opening through which fluid, gas, and combinations thereof can exit a component or apparatus.

"Outlet pressure" or "discharge pressure" is pressure measured at a fluid outlet.

The term "peritoneal dialysis fluid" refers to the mixture that is injected into a patient during peritoneal dialysis treatment. When properties of peritoneal dialysis fluid are described herein, such as its dielectric properties and permittivity, they refer to the properties of the fluid before use in treatment.

A "peritoneal dialysis system" is a collection of medical devices used to provide peritoneal dialysis treatment to a patient.

A "pressure sensor" is a system component that measures the pressure of a fluid at a particular point in the fluid flow path.

The term "programmed" can mean a series of instructions that cause a device or system to perform certain steps.

A "pump" is a component that applies mechanical force to move fluid.

The term "receiving" refers to the process of obtaining electronic information by any means.

"Resistance" refers to electrical resistance, defined as the ratio between electric potential and electric current in a circuit element. Resistance is calculated based on measured voltage and current, applying the equations disclosed herein.

A "rotary pump" is a pump with one or more rotating elements that can move a fluid along a flow path.

"Rotational speed" refers to the rate at which a component or device rotates about a given axis. Rotational speed can be measured in rotations per unit time by establishing when a particular orientation is referred to.

A "rotor" is a component of a rotating device, such as a rotary pump, that is designed to rotate relative to other components during normal operation of the device.

The term "sending" refers to the process of transmitting electronic information to be received.

A "sensor" is a device configured to determine a particular state of a component or system.

A "stepper motor" is device that drives a rotor by activating and deactivating a series of stationary electromagnets to exert asymmetrical forces on components of the rotor moves, thereby applying torque to the rotor.

"Suction pressure" refers to a negative pressure difference across a fluid path. In one non-limiting example, a pump having an inflow and outflow line can induce a suction pressure on an inflow line in the downstream direction during operation.

The term "upstream" refers to a position of a first component in a flow path relative to a second component wherein fluid will pass by the first component prior to the second component during normal operation. The first component can be said to be "upstream" of the second component, while the second component is "downstream" of the first component.

Sensors Across Pump

FIG. 1 shows a portion of a flow path including a rotary pump 101. The rotary pump 101 can be positioned in a chamber 102 between a fluid inlet 103 and fluid outlet 104. During operation, the pump 101 can rotate in a clockwise or counterclockwise direction to push fluid around the chamber 102 and increase fluid speed within the fluid path. As more force is applied to the pump 101 to increase rotational speed, the effect of the pump 101 on the fluid is increased. In one non-limiting embodiment, a shaft (not shown) can be inserted into a receiving molded portion of the pump 101 such that the shaft is not in fluid contact with an inner portion of the pump components of chamber 102. That way, the inserted shaft can provide rotational force to the internal vanes of the pump 101 while avoiding direct contact and therefore, possible contamination of the interior surfaces of the pump vanes, fluid paths of the fluid inlet 103 and fluid outlet 104, and interior surfaces in contact with the fluid being pumped of chamber 102. The rotation speed of a rotary pump is only one of several variables that influence the actual fluid flow rate across the pump. For example, flow path pressures and fluid density can also affect the rate of fluid flow across a rotary pump for a given rotation speed.

To determine the pressure differential introduced by the pump 101, pressure sensor 105 and pressure sensor 106 can be placed in the fluid inlet 103 and fluid outlet 104, respectively. The pressure sensor 105 and pressure sensor 106 can be intrusive sensors that detect fluid pressure in proportion to the pressure exerted on each of pressure sensor 105 and pressure sensor 106 by the fluid. In some implementations, one or both pressure sensor 105 and pressure sensor 106 may be built into valves (not shown) that can provide additional control over the fluid flow within the fluid paths of the fluid inlet 103 and fluid outlet 104. As the pressure at the fluid inlet 103 may primarily come from the action of the rotary pump 101, drawing fluid into the chamber 102, the inlet sensor 105 can be a suction pressure sensor configured to detect and measure the negative pressure from downstream. Correspondingly, the outlet sensor 106 may be a discharge sensor configured to detect and measure the positive pressure from upstream due to the rotary pump 101 pushing fluid out of the chamber 102.

A temperature sensor 107 can be included within the fluid paths of the fluid inlet 103 and fluid outlet 104 to measure the temperature of the fluid. The temperature sensor 107 may be, for example, a thermocouple or other temperature-sensitive element. Depending on the thermal properties of the fluid and of the walls of the fluid inlet 103, fluid outlet 104, and chamber 102, the temperature sensor 107 may be a non-intrusive sensor placed on any outside wall surface. In other embodiments, the temperature sensor 107 may be placed within a flow path to contact the fluid directly.

Figure 2:
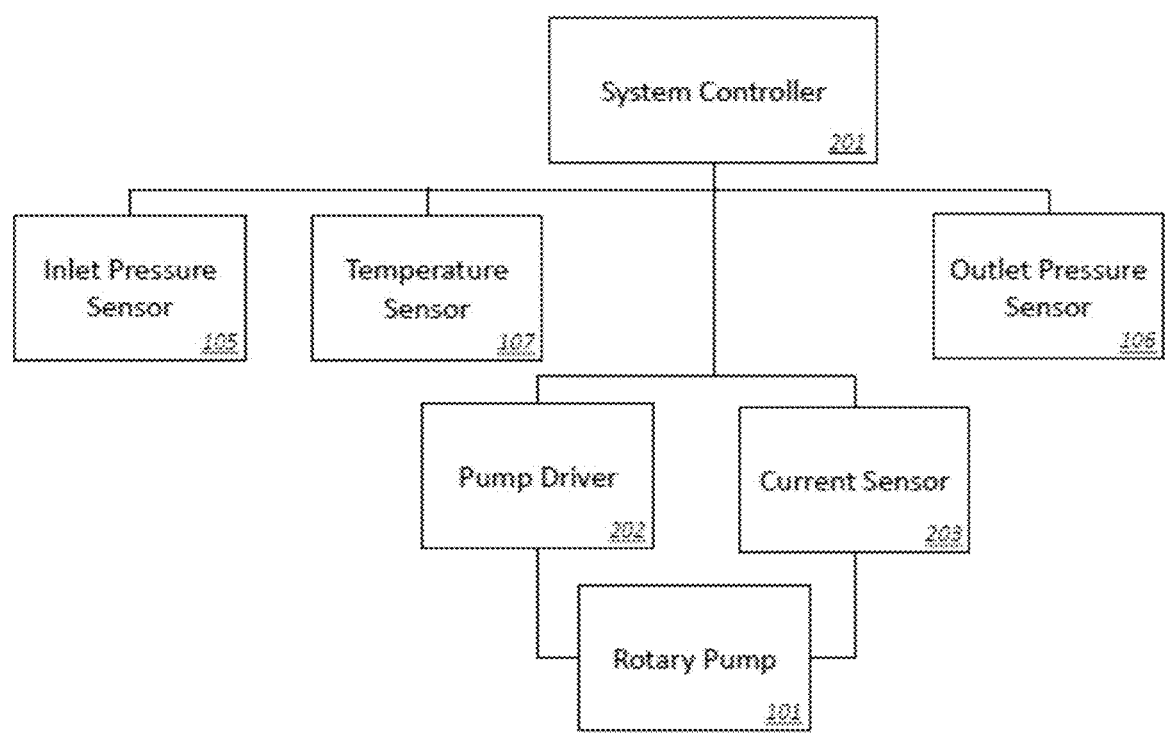
FIG. 2 is a diagram of electrical components of a fluid flow sensing system.

FIG. 2 is a system diagram showing sensor and controller components in electronic communication. An inlet sensor 105, outlet sensor 106, and temperature sensor 107, can each send signals to a system controller 201. Each signal may be raw data or may be calibrated measurement data in different configurations of the system. Activation and control of the sensors 105-107 may depend on the control of other system components and may be directly or indirectly operated by the system controller 201. In some implementations, one or more of the inlet sensor 105, outlet sensor 106, and temperature sensor 107 may be controlled by other means, such as activating automatically whenever certain changes in the fluid flow of the system are detected. Signals may be sent in response to particular commands, may be sent whenever a certain change is detected, may be sent periodically according to predetermined time intervals, or combinations of the these and other mechanisms for sensor operation as known in the art.

The rotary pump 101 may in turn be controlled by a pump driver 202, which may send control signals to the pump 101 to regulate rotational speed. In some embodiments, the pump driver 202 may include hardware or software components in common with the system controller 201. The driver 202 can also communicate the pump rotational speed to the system controller 201. In some embodiments, this speed may represent a setting used by the driver 202; in some embodiments, rotational speed may be a measurement obtained by the pump driver 202 according to one or more readings taken by sensors disposed about the pump in communication with the pump driver 202.

A current sensor 203 can send sensor data to the system controller 201 based on measurements taken of components of the system. The current sensor is configured to monitor and return data on the current load drawn to run the rotary pump 101 and can be disposed anywhere within the rotary pump motor and power source to measure and relay this data.

Figure 3:
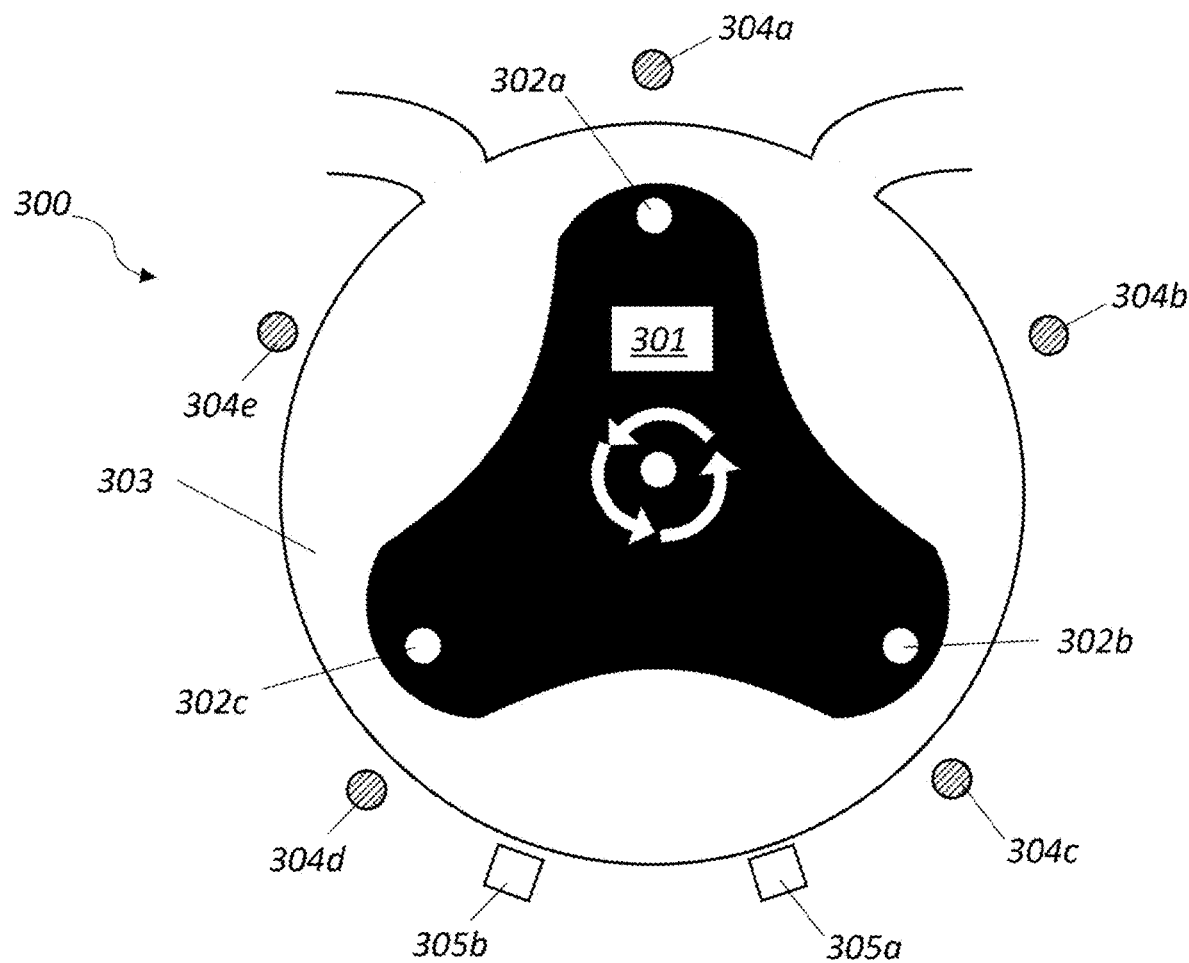
FIG. 3 is a cross-sectional view of a rotary pump within a fluid transport system.
Figure 4:
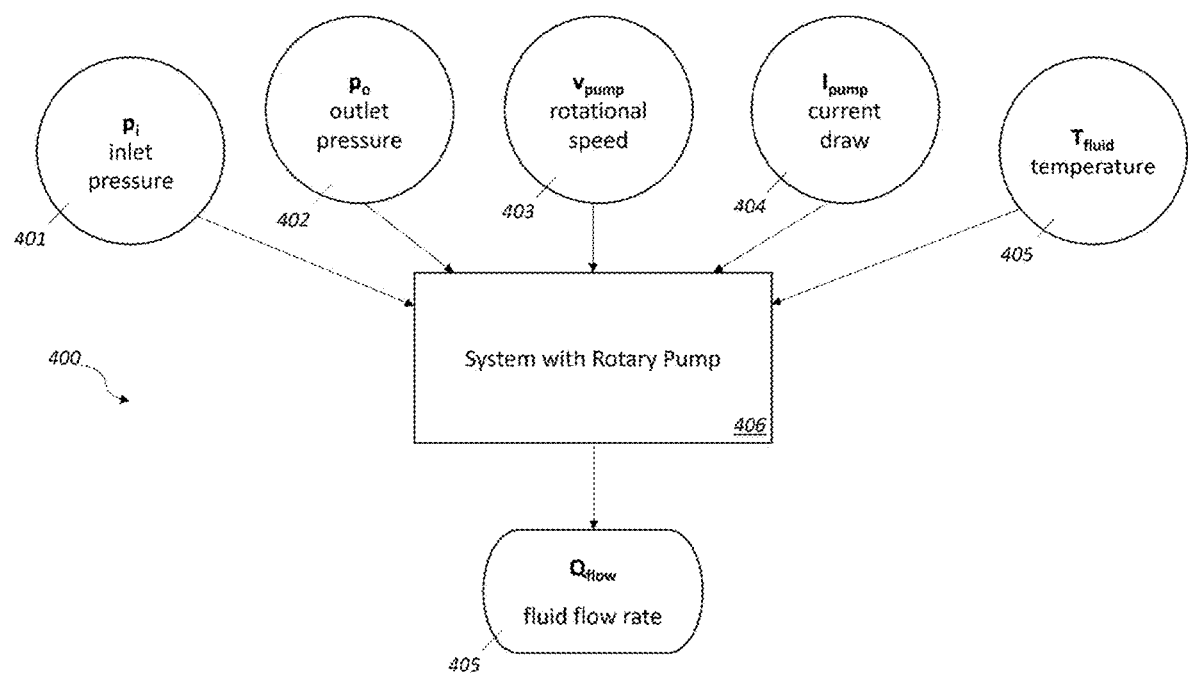
FIG. 4 is an illustration of a design of experiments (DOE) model for fluid flow across a rotary pump.

FIG. 3 shows a non-limiting embodiment of a rotary pump 300 driven by a motor. In one version, the motor is a stepper motor as defined herein. A rotor 301 includes a vane magnet 302a, a vane magnet 302b, and a vane magnet 302c that provide a basis for driving the rotor 301 within the chamber 303 in a rotational direction as shown. Stationary electromagnet 304a, electromagnet 304b, electromagnet 304c, electromagnet 304d, and electromagnet 304e, can be embedded in the walls of the chamber 303 and positioned to be proximate with each vane magnet 302a, a vane magnet 302b, and a vane magnet 302c, when the rotor 301 reaches a specified angular orientation with respect to the chamber 303.

Each of the electromagnet 304a, electromagnet 304b, electromagnet 304c, electromagnet 304d, and electromagnet 304e, can be switched on or off to impel the rotor 301 to rotate in the intended direction based on the positions of the vane magnet 302a, a vane magnet 302b, and a vane magnet 302c, which are known using Hall effect circuits 305a and 305b. The known position and distance of the Hall effect circuits, which report the proximity of a vane magnet, allow for the pump driver to determine the speed and relative rotational position of the rotor 301 and operate the electromagnet 304a, electromagnet 304b, electromagnet 304c, electromagnet 304d, and electromagnet 304e in the appropriate sequence.

FIG. 3 illustrates a design of experiments (DOE) model 400 using the sensor data collected in the system as independent variables. Inlet pressure $p_i$ (401), outlet pressure $p_o$ (402), rotational speed $v_{pump}$ (403), current draw $I_{pump}$ (404), and fluid temperature $T_{fluid}$ (405) are each measured by sensors as described above. Each variable can act as an input to the system 406, which may respond nonlinearly when producing the dependent variable $Q_{flow}$. In some embodiments, a slow or intrusive method of accurately measuring the fluid flow rate of the system may be used when carrying out the experiments that would not be suitable when using the system 405 for an intended purpose.

Under controlled conditions, each of the variables 401-405 is adjusted, alone and in combination with the others, to create a fit function $f_{flow(\ )}$ that models the effects of the independent variables on the system's flow rate. The resulting fit function, which may be any analytical function or set of functions as known in the art, can then be applied to calculate the flow rate when the independent variables are measured as described herein.

The pressure variables $p_o$ and $p_i$ are related according to Bernoulli's equation to the density of the fluid, $\rho$, as follows:

$$v_i^2/2 + g*h_i + p_i/\rho = v_o^2/2 + g*h_o + p_o/\rho$$

where $v_i$ and $v_o$ are the fluid inflow and outflow speeds, respectively, g is acceleration due to gravity, and h is the elevation at each point.

Fluid density is related to the measured independent variable, $T_{fluid}$, according to a reference density $\rho_0$ defined at a set temperature $T_0$ and a volumetric temperature coefficient $\beta$ that is characteristic for each fluid. The density is then given by the equation:

$$\rho = \rho_0/(1+\beta(T_{fluid}-T_0))$$

The torque necessary for the pump rotor to rotate at a particular speed will depend on the drag offered by the fluid in which the rotor moves, which in turn will vary based on the flow speed. Drag on the rotor will translate into resistance on the pump circuit, which is proportional to current drawn as follows:

$$V_{pump} = I_{pump} * R_{pump}$$

where $V_{pump}$ and $R_{pump}$ relate the voltage and resistance of the pump driver circuit to the current $I_{pump}$ of the circuit that is measured as described herein.

Figure 5:
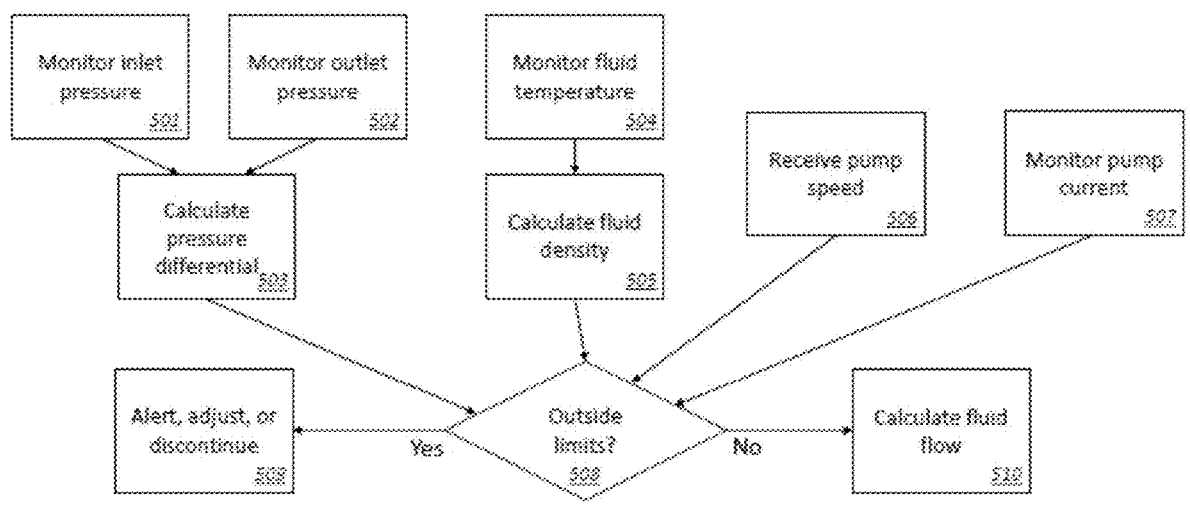
FIG. 5 is a flow chart showing steps for calculating fluid flow rate within a fluid transport system.

FIG. 5 illustrates a process in which the flow across a rotary pump is calculated using the components described above. The inlet and outlet pressures can both be monitored (steps 501 and 502) and used to determine a pressure differential (step 503). This pressure differential may be determined based on matching measurements between inlet and outlet sensors that take into account the two sensors may not be precisely synchronized. For example, where one sensor has not measured data within a given interval, data from the other sensor may be discarded. Alternatively, a signal may be sent to a sensor to collect further measurements whenever corresponding measurements are received that might otherwise not be used.

Subtracting the pressure at the inlet sensor from the pressure at the outlet sensor is the most straightforward way of determining the differential. However, one of ordinary skill in the art will recognize that other methods of using the two data points may be used. For example, data from one or both sensors may be adjusted before it is used to determine a pressure differential. A raw inlet pressure measurement $p_i$ and outlet pressure measurement $p_o$ might be first adjusted using fit formulas $f_{inlet}$ and $f_{outlet}$ as follows:

$$p^*_{inlet} = f_{inlet}(p_i)$$

$$p^*_{outlet} = f_{inlet}(p_o)$$

$$\Delta p = p^*_{outlet} - p^*_{inlet}$$

The fit formulas may, for example, be linear, polynomial, quadratic, or any analytic formula determined by experimentation with pressure sensors the rotary pump.

At step 504, the fluid temperature is monitored, which is then used to determine the density of the fluid (step 505). Density values may, in some embodiments, be calculated using a formula that is based on knowing the fluid for which the system is used. For example, when a pump is used to transport water for filtration and use in medical treatment, the known density of water at different temperatures can be used to determine the density of water based on measured temperature in the flow system. When a pump is used to transport peritoneal dialysis fluid, additional properties of the fluid, such as the solute concentration for different additives, may also be needed to accurately calculate fluid density. These properties may be measured or may be received from controller elements associated with the preparation and/or administration of the fluid. In different embodiments, controller elements associated with preparation and/or administration of the fluid may be integrated with, or separate from, controller elements associated with monitoring and controlling the rotary pump as described herein.

At step 506, the system receives the speed of the rotary pump, which may come from the pump driver or an analogous component. In different embodiments, this speed may reflect a measurement of the pump rotor or may instead reflect a setting for what speed a command to the pump indicates it should move at. Depending on the measurement fidelity, and/or the accuracy of the pump driver compared to its setting, the received value may be calibrated before it is used.

At step 507, the current used by the pump is monitored. This reflects the load required by the stepper motor or other device driving the rotary pump to maintain the pump at the regulated speed, with a higher load representing greater resistance by the fluid.

At step 508, if any of the given settings are outside established limits, the system may take corrective action (step 509). This may be in the form of an automated adjustment, an alert to user or other system, or a temporary halt to the pump or some other fluid flow components. The action taken can depend on the number of parameters exceeded, the specific parameter being monitored, and the scalar difference.

If all the reported values fall within acceptable limits, then the system calculates the fluid flow across the pump (step 510). Rather than a simple linear or polynomial equation, this calculation may involve the application of different analytic functions depending on where each of the measured and calculated values fall. We can generalize the equation to a four-parameter analytic function as follows:

$$Q_{flow} = f_{flow}(\Delta \rho, \delta_{fluid}, v_{pump}, I_{pump})$$

where $\rho_{fluid}$ is the fluid density, $v_{pump}$ is the angular velocity of the pump, and $I_{pump}$ is the current load of the pump. The resulting value is the volumetric flow rate for the fluid flow path across the pump.

Figure 6:
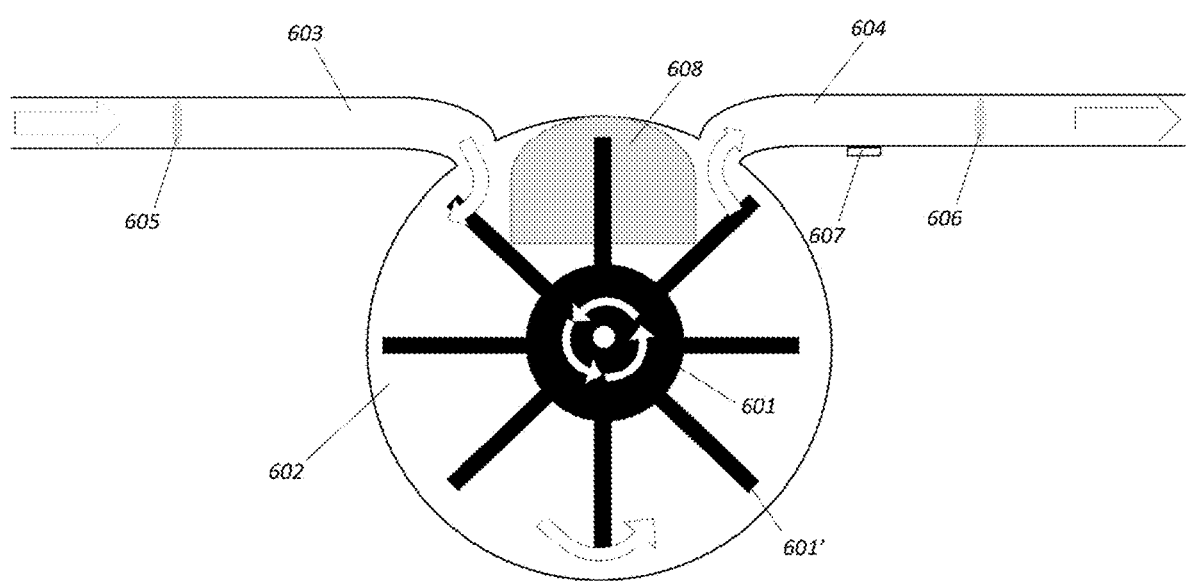
FIG. 6 is a cross-sectional view of a portion of a fluid transport system having vanes.

FIG. 6 illustrates another example of a rotary pump 601 in a chamber 602 for which conventional sensors can non-intrusively and accurately calculate fluid flow. Here, the pump 601 includes eight vanes 601' that extend most of the distance between the center of the chamber 602 and the chamber walls. Fluid inlet 603 and fluid outlet 604 each include a pressure sensor 605 and 606 respectively, similar what is described above.

A temperature sensor 607 can be placed at the fluid outlet 604. The fluid outlet 604 may be found, experimentally, to provide a more accurate temperature measurement for the purposes of calculating an accurate fluid flow, or the position may be more convenient for placing the sensor 607 for mechanical reasons. A barrier 608 may also be present within the chamber 602 that can be passed by the vanes 601' but reduces the flow of fluid in the upper sector of the chamber 602 between the inlet 603 and outlet 604. This can help prevent undesired backflow that might otherwise be expected as part of the rotational movement of the pump rotor.

Figure 7:
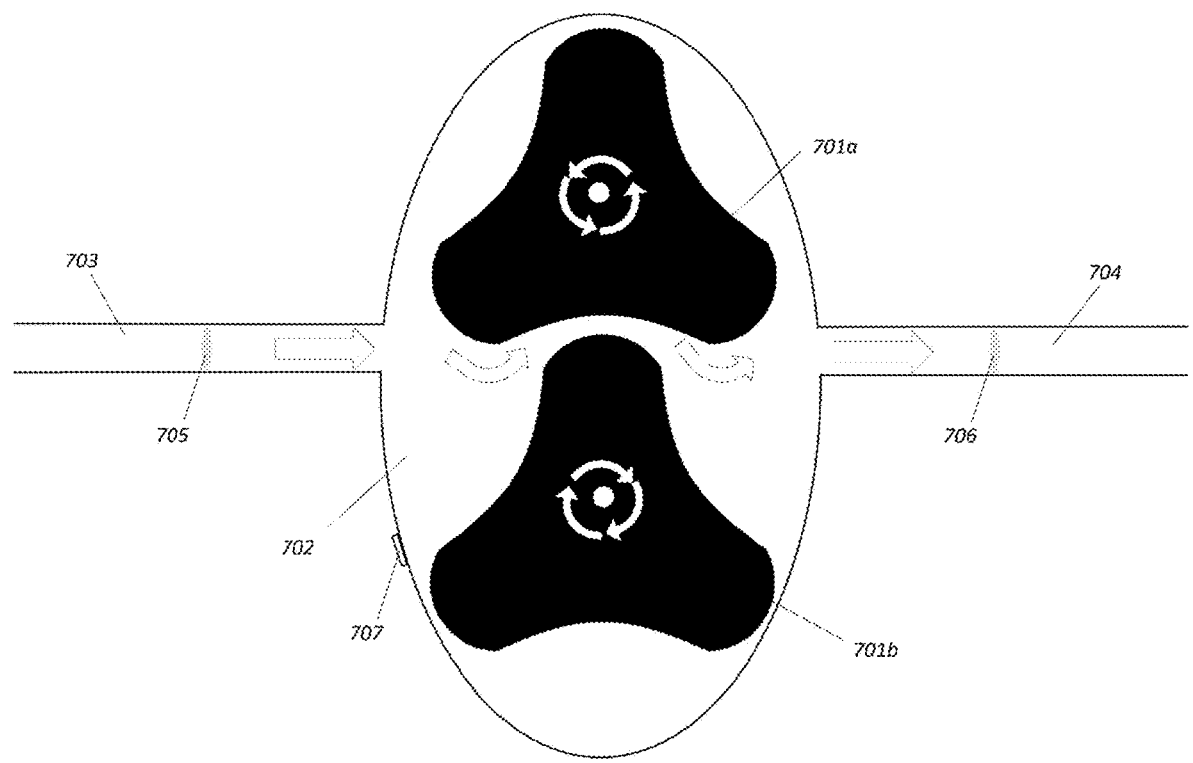
FIG. 7 is a cross-sectional view of a portion of a fluid transport system having rotating pumping compartments.

FIG. 7 illustrates a rotary pump having two rotors 701a and 701b which rotate in an interlocking manner within a chamber 702 to promote fluid flow across the center of the chamber 702 as shown. Here, the fluid inlet 703 and fluid outlet 704 are located at directly opposite sides of the chamber 702. In some embodiments, the driver associated with the action of this pump may coordinate the rotations of the rotors 701a and 701b to avoid interference between them. An inlet pressure sensor 705 is disposed at the fluid inlet and an outlet pressure sensor 706 at the fluid outlet. The temperature sensor 707 is adjacent the wall of the chamber 702 itself, which may in some embodiments allow for a more useful temperature measurement for calculating the fluid flow rate.

The shape of the chamber 702 is shown to be roughly elliptical, but the shape and the shape of the rotors 701a and 702b can vary according to the desired flow characteristics of the pump. In some embodiments, the shape and size of the pump chamber and the rotors, as well as the number and positions of the rotors, may be additional independent variables that are investigated in generating accurate calculation models for fluid flow.

One skilled in the art will understand that various combinations and/or modifications and variations can be made in the described systems and methods depending upon the specific needs for operation. Various aspects disclosed herein may be combined in different combinations than the combinations specifically presented in the description and accompanying drawings. Moreover, features illustrated or described as being part of an aspect of the disclosure may be used in the aspect of the disclosure, either alone or in combination, or follow a preferred arrangement of one or more of the described elements. Depending on the example, certain acts or events of any of the processes or methods described herein may be performed in a different sequence, may be added, merged, or left out altogether (e.g., certain described acts or events may not be necessary to carry out the techniques). In addition, while certain aspects of this disclosure are described as performed by a single module or unit for purposes of clarity, the techniques of this disclosure may be performed by a combination of units or modules associated with, for example, a device.

What is claimed is:

1. A system for fluid flow, comprising:
   a rotary pump;
   an inflow line and an outflow line in fluid communication with the rotary pump;
   an inlet pressure sensor at the inflow line;
   an outlet pressure sensor at the outflow line;
   a current sensor measuring current drawn by the rotary pump; and
   a circuit calculating fluid flow rate through the system based on a density value for a fluid pumping through the system, rotational speed of the rotary pump, inlet pressure at the inflow line, outlet pressure at the outflow line, and current drawn by the rotary pump.

2. The system of claim 1, further comprising a temperature sensor measuring a temperature of the fluid pumping through the system, the density value for the fluid determined from the measured temperature.

3. The system of claim 2, wherein the fluid is peritoneal dialysis fluid, and wherein the density value for the liquid is a known value for the density of peritoneal dialysis fluid at the measured temperature.

4. The system of claim 2, wherein the inlet pressure sensor, the outlet pressure sensor, and the temperature sensor are each non-intrusive sensors.

5. The system of claim 4, the circuit determines a resistance for the rotary pump based on the rotational speed of the rotary pump and the current drawn by the rotary pump, the determined resistance relating a known voltage of the rotary pump to the drawn current.

6. The system of claim 1, the rotary pump having a driver controlling the rotational speed of the rotary pump, the driver communicating the rotational speed of the rotary pump to the circuit calculating the liquid flow rate through the system.

7. The system of claim 1, wherein the circuit determines fluid flow, Q, to an area A within the inflow line and a velocity v of fluid flow within the inflow line according to the equation: $Q=A*v$.

8. The system of claim 1, wherein the circuit determines fluid flow, Q, to an area A within the outflow line and a velocity v of fluid flow within the outflow line according to the equation: $Q=A*v$.

9. The system of claim 1, the circuit relating the inlet pressure, $p_o$, the outlet pressure, $p_i$, and the fluid density value, $\rho$, according to the equation:

$$v_i^2/2+g*h_i+p_i/\rho=v_o^2/2+g*h_o+p_o/\rho$$

where $v_i$ is the velocity of fluid flow within the inflow line, $v_o$ is the velocity of flow within the outflow line, g is the acceleration due to gravity, $h_i$ is the height of the inflow line, and $h_o$ is the height of the outflow line.

10. A method for determining fluid flow across a rotary pump, comprising:
    calculating a fluid flow rate based on a rotational speed of the rotary pump, a pressure difference between a fluid intake and fluid discharge across the rotary pump, a determined density value for the fluid, and a measured current drawn by the rotary pump.

11. The method of claim 10, further comprising the steps of:
    calculating a pressure difference between a fluid inflow line and a fluid outflow line based on a measured suction pressure at the fluid inflow line in fluid communication with the rotary pump and a discharge pressure at the fluid outflow line in fluid communication with the rotary pump.

12. The method of claim 10, further comprising the steps of:
    measuring the current, I, drawn by the rotary pump; and
    comparing the drawn current and a known voltage, V, of the rotary pump to the rotational speed of the rotary pump to determine a resistance, R, for the rotary pump according to the following equation: $V=I*R$
    wherein the fluid flow is calculated based on the determined resistance.

13. The method of claim 10, further comprising the step of displaying the calculated fluid flow rate.

14. The method of claim 10, wherein the density value for fluid moving across the rotary pump is determined by measuring a temperature for the fluid and calculating the density based on the measured temperature.

15. The method of claim 10, wherein the rotational speed of the rotary pump is measured by a driver regulating the speed of the rotary pump.

16. The method of claim 10, further comprising the step of calculating the fluid flow, Q, by relating to an area A within an inflow line and a velocity v of fluid flow within an inflow line according to the equation: $Q=A*v$.

17. The method of claim 10, further comprising the step of calculating the fluid flow, Q, by relating to an area A within an outflow line and a velocity v of fluid flow within an outflow line according to the equation: $Q=A*v$.

18. The method of claim 10, further comprising the step of calculating the fluid flow by relating an inlet pressure, $p_o$, an outlet pressure, $p_i$, and the fluid density value, $\rho$, according to the equation:

$$v_i^2/2+g*h_i+p_i/\rho=v_o^2/2+g*h_o+p_o/\rho$$

where $v_i$ is the velocity of fluid flow within an inflow line, $v_o$ is the velocity of flow within an outflow line, g is the acceleration due to gravity, $h_i$ is the height of the inflow line, and $h_o$ is the height of the outflow line.

19. The method of claim 10, further comprising the steps of:

applying current drawn by the rotary pump and temperature of the fluid as independent variables in modeling the fluid flow across the pump; and calculating the fluid flow based on the modeling.

20. The method of claim 19 wherein a measured suction pressure at an inflow line and a measured discharge pressure at an outflow line are independent variables in modeling the fluid flow across the pump.

* * * * *